(12) United States Patent
Deb et al.

(10) Patent No.: US 10,763,966 B1
(45) Date of Patent: Sep. 1, 2020

(54) DATA COMMUNICATIONS SYSTEM USING AN OPTICAL ANTENNA

(71) Applicant: Otago Innovation Limited, Dunedin (NZ)

(72) Inventors: Amita Bikram Deb, Dunedin (NZ); Niels Kjaergaard, Dunedin (NZ)

(73) Assignee: Otago Innovation Limited, Dunedin (NZ)

( * ) Notice: Subject to any disclaimer, the term of this patent is extended or adjusted under 35 U.S.C. 154(b) by 0 days.

(21) Appl. No.: 16/363,965

(22) Filed: Mar. 25, 2019

(51) Int. Cl.
*H04B 10/2575* (2013.01)

(52) U.S. Cl.
CPC ............................. *H04B 10/25759* (2013.01)

(58) Field of Classification Search
CPC .................................................. H04B 10/25759
See application file for complete search history.

(56) References Cited

U.S. PATENT DOCUMENTS

| | | | | |
|---|---|---|---|---|
| 2003/0189748 | A1* | 10/2003 | Wang | G02B 26/0833 359/291 |
| 2007/0120563 | A1* | 5/2007 | Kawabata | G01R 33/0354 324/244.1 |
| 2011/0101974 | A1* | 5/2011 | Nagasaka | G01R 33/0322 324/244.1 |
| 2013/0003766 | A1* | 1/2013 | Savchenkov | G04F 5/14 372/38.01 |
| 2015/0109061 | A1* | 4/2015 | Kriz | G04F 5/14 331/94.1 |
| 2016/0363617 | A1* | 12/2016 | Anderson | G01R 29/0885 |
| 2017/0315054 | A1* | 11/2017 | Lukens | G01J 3/26 |
| 2018/0292474 | A1* | 10/2018 | Raz | G01V 3/165 |
| 2019/0187198 | A1* | 6/2019 | Anderson | G01R 29/0878 |
| 2019/0267772 | A1* | 8/2019 | Fritsche | H01S 5/0228 |

OTHER PUBLICATIONS

Deb, A.B. et al. "Radio-over-fiber using an optical antenna based on Rydberg states of atoms." University of Otago, May 29, 2018; 5 pgs.
Meyer, David H. et al. "Digital Communication with Rydberg Atoms & Amplitude-Modulated Microwave Fields." U.S. Army Research Laboratory, Oct. 29, 2018; 10 pgs.
Song, Zhenfei et al. "The credibility of Rydberg atom based digital communication over a continuously tunable radio-frequency carrier." Physics.atom-ph, Sep. 5, 2018; 5 pgs.
"Digital Communication with Rydberg Atoms & Amplitude-Modulated Microwave Fields," David Meyer et al., https://arxiv.org/abs/1803.03545v1.

* cited by examiner

*Primary Examiner* — Mina M Shalaby
(74) *Attorney, Agent, or Firm* — Barnes & Thornburg LLP (57) ABSTRACT

In one embodiment, there is provided an apparatus for converting an analogue radio-frequency (RF) signal to an optical signal. The apparatus may include: a vapor cell enclosing a gas of atoms; a probing light source configured to propagate a probing light beam through the vapor cell, a frequency of the probing light beam being tuned across a range in which the atoms transition from a first quantum state to a second quantum state; and, a coupling light source configured to propagate a coupling light beam through the vapor cell, a frequency of the coupling light beam being resonant or off-resonant with transition of the atoms from the second quantum state to a Rydberg state; wherein the vapor cell is configured such that on exposure thereof to an RF field carrying information from the RF signal, the apparatus is configured to encode the RF signal into the probing light beam.

16 Claims, 6 Drawing Sheets

DATA COMMUNICATIONS SYSTEM USING AN OPTICAL ANTENNA

FIELD

The present invention generally relates to data communications which allow transmission and/or conversion of Radio Frequency (RF) signals to the optical domain, and more particularly to an optical antenna for detecting and converting RF and microwave signals to an optical signal.

BACKGROUND

Modern communication systems are based on a number of key technologies (a) wireless systems such as Wi-Fi—which relies on RF electromagnetic fields for wireless communication of data over relatively short distances, (b) optical communication where light travelling through optical fibers conveys information, often over very long distances, and/or (c) optical communication where light travelling through free-space conveys information over a short distance (e.g., Radio-over-Free-Space (RoFS) including Light-Fidelity (Li-Fi)). RF-based communication is a vital part of modern communications, enabling compact, portable, and smart telecommunication devices to exchange data and the Internet of Things (IoT). However, these RF-based systems have a relatively short range (typically up to 100 meters). Optical communication, on the other hand, can have a very large range (thousands of kilometres).

Figure 1:
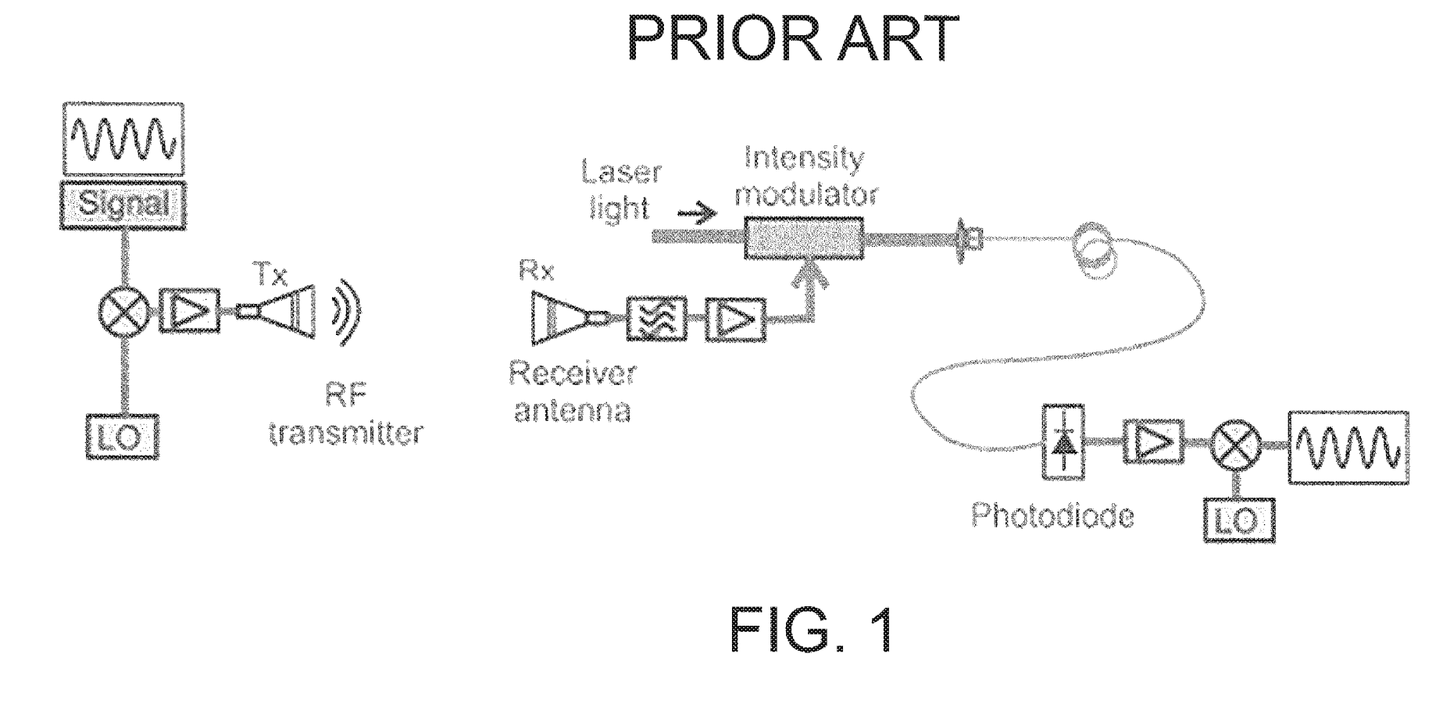
FIG. 1 is a simplified illustration of a conventional RoF system known in the art.

Devices that link RF data to optical data therefore constitute an extremely valuable emergent technology. Radio-over-Fiber or Radio-Frequency-over-Fiber (hereinafter referred to as RoF) devices typically allow conversion of RF signals to the optical domain and further transmission via optical fibers. Conventional RoF devices, as shown in FIG. 1, include a signal source, an RF-to-optical encoder, a fiber-optic link, a photodetection unit and demodulation electronics. In these systems, RF-to-optical encoding is traditionally achieved by either (i) intensity modulation of a laser source via, e.g., controlling laser current, or (ii) intensity/phase modulation of light using electro-optical crystals, both using guided RF signals. This requires direct electrical connection and complex amplification and filtering stages. Efficient conversion of microwave signals into an optical signal is therefore an outstanding challenge due to small Kerr nonlinearities of conventional crystals, often necessitating high optical pump power. This renders high modulation-depth and efficient optical encoding of RF signals a difficult task.

There is therefore a need for improved data communications system architectures and/or an improved optical antenna that will enable direct encoding of free-space RF signals into the optical domain and eliminate the need for any electrical contacts at the receiver end, or at least a need for a useful alternative.

SUMMARY

It is an object of the invention to provide a system and/or method and/or apparatus that at least goes some way to addressing at least one of these needs, or other needs as will become apparent herein.

To those skilled in the art to which the invention relates, many changes in construction and widely differing embodiments and applications of the invention will suggest themselves without departing from the spirit or scope of the invention as defined in the appended claims. The disclosures and the descriptions herein are purely illustrative and are not intended to be in any sense limiting.

BRIEF DESCRIPTION OF THE DRAWINGS

One preferred form of the present invention will now be described with reference to the accompanying drawings in which.

DETAILED DESCRIPTION

In the following description, numerous specific details are set forth in order to provide a thorough understanding of the various principles of the present invention. However, those skilled in the art will appreciate that not all these details are necessarily always required for practicing the present invention.

Although the principles of the present invention are largely described herein in relation to data communications between devices, this is an example selected for convenience of presentation, and is not limiting. Those skilled in the art will understand that the principles and the different configurations of the data communications system and/or optical antenna could be applied to many different fields for various applications such as for example, but not limited to, imaging (e.g., medical or security devices), detecting electromagnetic fields, communication between satellites, electrometry, etc.

Similarly, although the principles of the present invention are largely described herein in relation to an RoF system, this is an example selected for convenience of presentation, and is not limiting. Those skilled in the art will understand that the principles and the different configurations of the RoF system and/or optical antenna could be implemented with any suitable data communications system configured to convert an RF signal to an optical signal for further transmission by any suitable means such as, for example, but not limited to, RoFS including Li-Fi. RoFS is a data transfer protocol similar to radio-over-fiber (RoF) in which light carrying data travels in free-space rather than through fiber. This technology is particularly useful in different applications, e.g., satellite to satellite data transfer. Other applications, systems and/or technologies adapted to include an optical antenna as described hereinbelow will be apparent to those skilled in the art.

Figure 2:
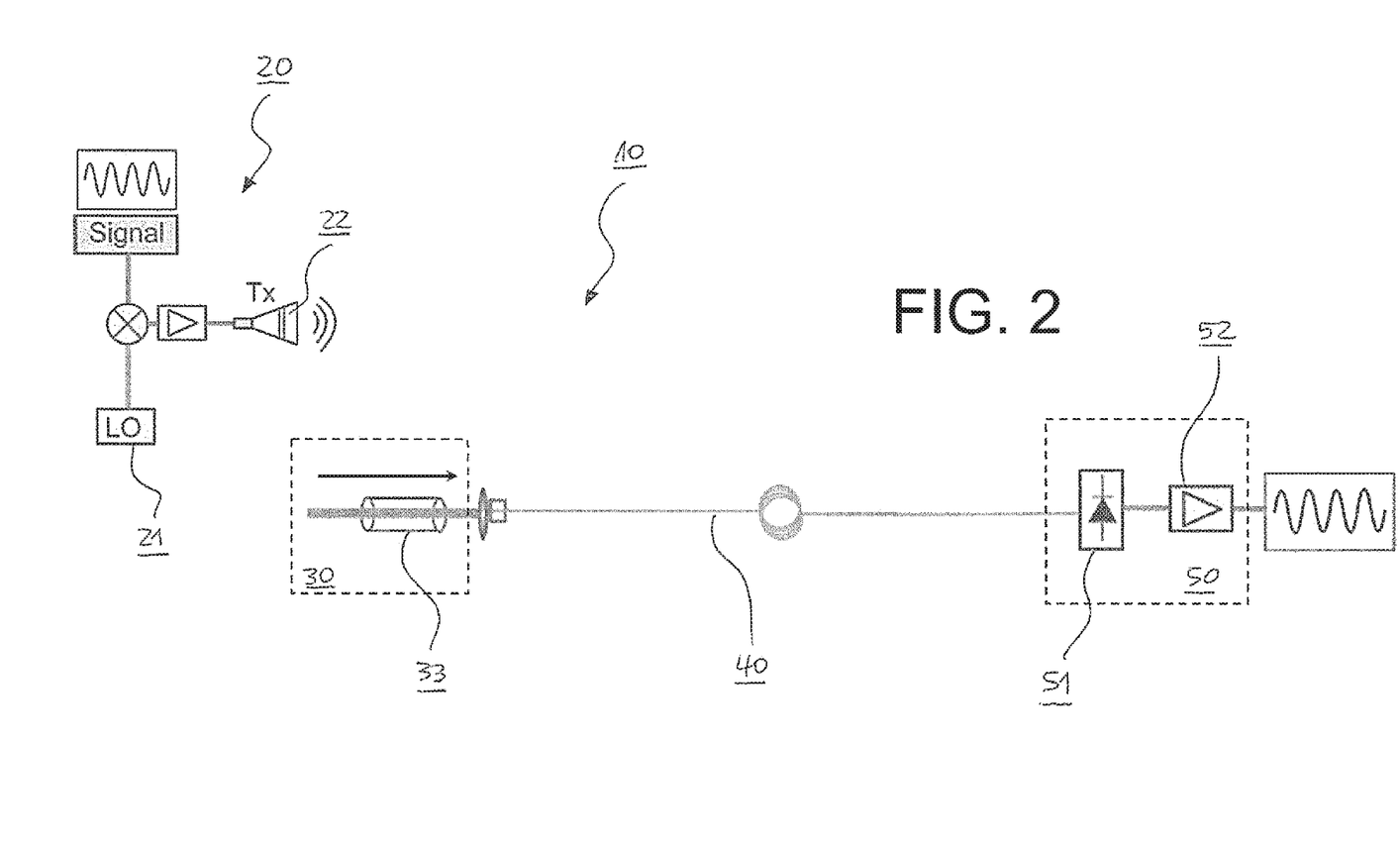
FIG. 2 is a simplified illustration of an RoF system and optical antenna constructed and operative in accordance with embodiments of the invention.

Reference is now made to FIG. 2, which is a simplified illustration of a RoF system constructed and operative in accordance with embodiments of the invention. The RoF system 10 of FIG. 2 is comprised generally of one or more sources of RF signals 20, one or more optical antennas 30, one or more optical fibers 40, and an decoder 50.

The source 20 of signals may comprise any suitable components and circuitry to encode data into an RF signal and to propagate the RF signal through space as an electromagnetic wave. For example, an analogue or digital signal may be mixed at the source 20 with a local oscillator 21, amplitude and/or phase modulated, and coupled to free-space via a transmitter 22.

Figure 3:
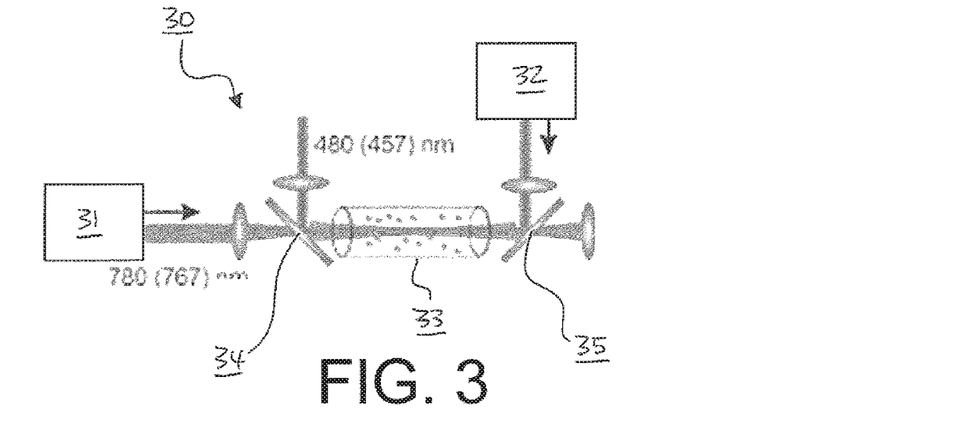
FIG. 3 is a simplified illustration of an optical antenna, constructed and operative in accordance with embodiments of the invention.
Figure 4:
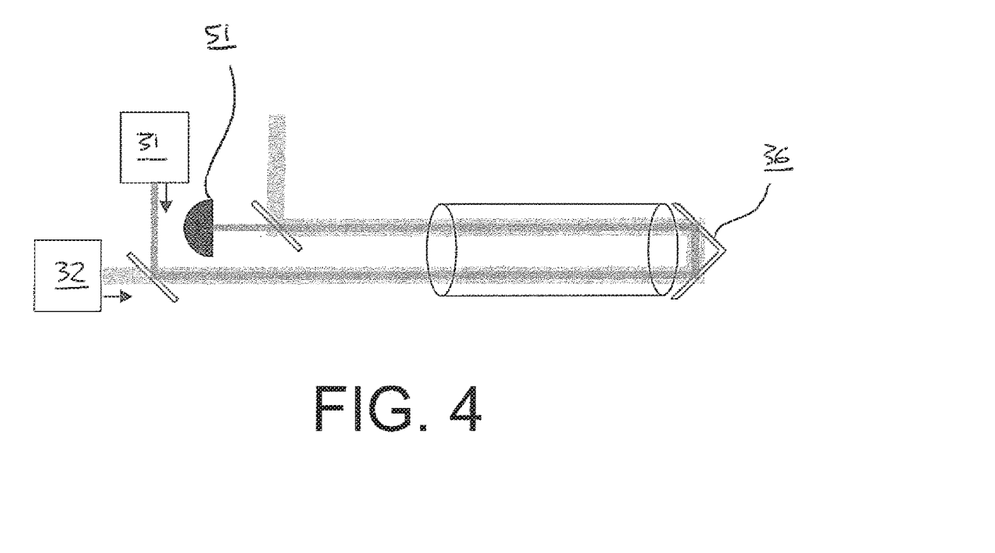
FIG. 4 is a simplified illustration of an optical antenna, constructed and operative in accordance with other embodiments of the invention.

The optical antenna 30 (depicted in FIGS. 3 and 4) may comprise one or more light sources 31, 32 and a gas or vapor cell 33 comprising a housing enclosing a gas of atoms. A probing light beam may be provided by a probing light source 31 and a coupling light beam may be provided by a coupling light source 32. The probing light source 31 is arranged such that the generated probing light beam passes through the cell 33 from a first end to a second end, opposite to the first end, of the housing (FIG. 3). In another embodiment (FIG. 4), the probing light source 31 and coupling light sources are arranged such that the probing light beam enters in and comes out of the same end of the gas or vapor cell 33 upon passing through a corner cube used as a retro-reflector 36. In this configuration, the light beams are retroflected back into a parallel but axially separated mode. In another embodiment, the retro-reflector 36 may include any confocal or afocal retroreflector configured to couple back to the same or similar axial optical mode. For example, one or more optical-refractive-index mismatched surface(s) (therefore at least partially reflecting) may be used as the confocal or afocal retroreflector. These mismatched surfaces may be not-flat. For example, the mismatched surfaces may be aspherical, near-spherical or spherical concave surfaces. The atoms of the gas enclosed in the cell 33 have special states, called Rydberg states, that are more sensitive to RF fields than normal atoms. Exposure of the atoms enclosed in the cell 33 to the RF field generated by the source 20 causes a modulation of the probing light beam passing through the cell 33 such that the amplitude and phase modulation of the RF signal is encoded into the probing light beam leaving the cell 33. The modulated probing light beam is then passed through the optical fiber 40 to the decoder 50.

The decoder 50 may comprise a light detector 51 such as for example, but not limited to, a photodiode that generates a photocurrent proportional to the optical intensity of the received probing light beam. The decoder 50 may further comprise a transimpedance amplifier 52 arranged to convert the generated photocurrent to a photovoltage that contains the original signal. In another embodiment, the decoder 50 may comprise an optical amplifier that amplifies the optical signal directly, without the need to convert it to an electrical signal before amplification. In any case, the RoF system 10 and the optical antenna 30 allow for a direct encoding/transfer of data embedded in RF signals to the optical domain. Further, the RoF system 10 and the optical antenna 30 provide a far simpler and more versatile architecture than conventional RoF devices which require complex architectures including metal components, electrical contacts, amplifiers, demodulation electronics, etc.

As explained hereinabove, the RoF system 10 uses an optical antenna 30 comprising a gas or vapor cell 33. In some embodiments, the RoF system 10 and/or the optical antenna 30 allow RF signals to be transferred to the optical domain by using Rydberg states of atoms in the gas or vapor cell 33 and establishes an electromagnetically induced transparency (EIT) resonance condition. Rydberg atoms have been used in optics and physics in recent years and are excited atoms that have very high principal quantum numbers. These highly excited states of atoms have a number of peculiar properties including, but not limited to, very high AC polarizabilities making them extremely sensitive to electric and magnetic fields spanning from the MHz to THz frequency domains. Rydberg atoms are also amenable to precise optical detection using suitable light sources. EIT in three-level atomic systems—where quantum interference renders an opaque atomic medium transparent when a resonance condition is met—can therefore be used as means to optically detect these Rydberg states.

Figure 5:
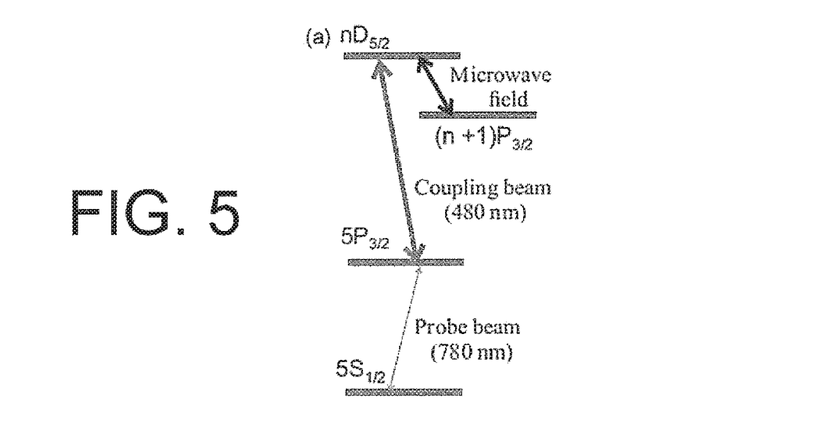
FIG. 5 is a simplified illustration showing the energy states of atoms provided in a gas or vapor cell, constructed and operative in accordance with embodiments of the invention.

The gas or vapor cell 33 of the optical antenna 30 encloses an atomic vapor comprising, for example, but not limited to, rubidium and/or potassium atoms, although any suitable alkali metals and/or alkaline earth metals may be used. FIG. 5 shows example energy states of atoms that may be used in the RoF system 10 for realizing the optical antenna 30 as well as the wavelengths of the probing and coupling light beams. An intense coupling light beam (coupling laser beam) may be frequency-tuned close to the resonance (at resonance or just off-resonance) between a first excited state (5P3/2) and a particular Rydberg state, e.g., nD5/2, where n is comprised for example between 45 and 57. Although n (principal quantum number) is provided here between 45 and 57, those skilled in the art will appreciate that the RoF system 10 and/or optical antenna 30 may operate at any values of the principal quantum number and that this range is provided as an example only and is not limiting. Atoms in their ground state (5S1/2) may be optically interrogated by a weak probing light beam (probing laser beam) tuned across the 5S1/2↔5P3/2 transition. In the presence of the intense coupling light beam, a transparency window opens at the probing light beam resonance causing an enhanced transmission of the probe light beam through the gas or vapor cell 33. If a microwave field couples the Rydberg state nD5/2 to another nearby Rydberg state, the EIT resonance may be split into two peaks (known as Autler-Townes splitting). In one embodiment, the RF field generated and transmitted by the source 20 couples the Rydberg state nD5/2 to the Rydberg state (n+1)P3/2, and the amount of splitting varies linearly with the RF field. Due to the high AC polarizability of Rydberg states, even weak RF fields can lead to a substantial Autler-Townes splitting, thereby modifying the EIT resonance window. Amplitude and/or phase modulation of the RF field generated by the source 20 can therefore cause a modulation of the probing light beam generated by the probing light source 31 when passing through the gas or vapor cell 33. The RF system 10 and/or the optical antenna 30 is therefore operative to encode the amplitude and/or phase of the RF signal in the optical domain. In turn, the probing light beam relays the encoded data to the decoder 50 that outputs a photocurrent proportional to the optical intensity of the received probing light beam. In other embodiments, different pairs of Rydberg states may be used to encode different RF signals generated by the source 20 into different carrier RF fields without requiring any physical reconfiguration of the RoF system 10 and/or the optical antenna 30. Non-limiting examples of Rydberg states that may be used to encode RF signals into different carrier RF fields are listed below—

48D5/2↔49P3/2 (19.3 GHz);
50D5/2↔51P3/2 (17 GHz);
53D5/2↔54P3/2 (14.2 GHz); and,
55D5/2↔56P3/2 (12.7 GHz).

In some embodiments, the wavelength of the coupling light beam is approximately 480 nm ("blue") and the wavelength of the probing light beam is approximately 780 nm ("infrared"). These light beams (depicted in FIGS. 3-4) may be obtained from/generated by any suitable lasers such as for example, but not limited to, derived from external cavity diode lasers. About 25 mW of the blue light may be focused to a 90 μm spot size radius in the gas or vapor cell 33. Counter-propagating to the coupling light beam (FIG. 3), the probing light beam may be focused into a 80 μm spot size radius having a power of about 4 μW. The probing and coupling light beams may be combined and separated using dichroic mirrors 34, 35 that are both vertically polarized. To increase the vapor pressure, the RoF system 10 and/or the optical antenna 30 of FIGS. 3-4 may comprise a thermal control elements (heating and/or cooling elements) configured to stabilize the gas or vapor cell 33 at a desired temperature. For example, the RoF system 10 and/or optical antenna 30 may comprise a thermal control element configured to increase, stabilize, or decrease a temperature of the gas or vapor cell to a temperature of about 40, 50, or 60° C. By coarse tuning of the blue laser, the RoF system 10 a range of Rydberg states nD5/2,3/2 can be accessed and used by the RoF system 10 and/or the optical antenna 30.

The source 20 may be or comprise a standard Wi-Fi router. In one embodiment, the source 20 may comprise a signal generator 21 configured to generate microwave fields that are then propagated to free space via an antenna or a transmitter/emitter 22. For phase modulation protocols for data transfer, the transmitter/emitter 22 may comprise two antennas with the same carrier frequency obtained from the same source. Data encoded in the phase-modulation on one of them can subsequently be directly read out by the optical antenna 30. The antenna 22 may be any suitable antenna such as for example, but not limited to, a helical end-fire antenna with an estimated gain of about 18 dBi at about 15 GHz. The antenna 22 may be configured to produce circularly-polarized microwave fields. The emitter antenna may, for example, be placed 0.5 m away from the gas or vapor cell 33 and configured to provide a microwave power of up to 12 dBm. Assuming that the atoms are located along the axial direction of the antenna 22 and that no reflection of the microwave field from nearby objects is present, a power-feed of −15 dBm in the antenna 22 corresponds to a field intensity of about 1 μW/cm2 at the location of the atoms. After passage through the gas or vapor cell 33, the weak probing light beam may be coupled to an high efficiency multimode optical fiber 40 and be detected at the decoder 50 on a fast (100 MHz bandwidth), fiber-coupled AC photodetector 51 (e.g., Thorlabs PDB415A). The decoder 50 may further comprise a high-pass filter with a 100 kHz cutoff point configured to eliminate a weak 75 kHz modulation present in the probing light beam originating from a lock-in amplifier used for frequency-locking the laser.

Figure 6:
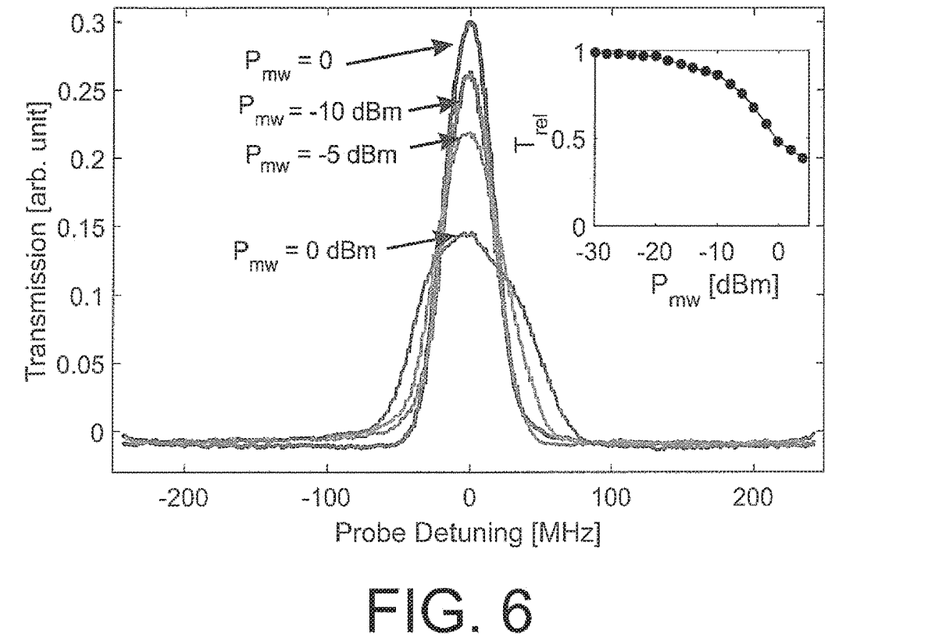
FIG. 6 is a graph illustrating the effect of a microwave carrier at 19.3 GHz on a transmission of a probing light beam at various levels of microwave power fed into the optical antenna.

FIG. 6 shows a background-subtracted transmission of the probing light beam across the 5S1/2↔5P3/2 transition in the presence of the coupling light beam tuned to the 5P3/2↔48D5/2 transition. In the presence of a microwave field at a frequency of 12.7 GHz, the probing light beam transmission drops. The Autler-Townes spectrum is not resolved at low microwave powers due to the use of circularly-polarized microwave fields, which causes the vector nature of the AC polarizability to play a role and gives rise to a central peak that decreases with increasing microwave power. The inset in FIG. 6 shows the relative transmission of the probing light beam at resonance as a function of the microwave power.

The dependence of the light transmission on the microwave field strength allows the RoF system 10 and/or the optical antenna 30 to modulate the probing light beam transmission by modulating the carrier microwave field using the RF field generated at source 20.

Figure 7:
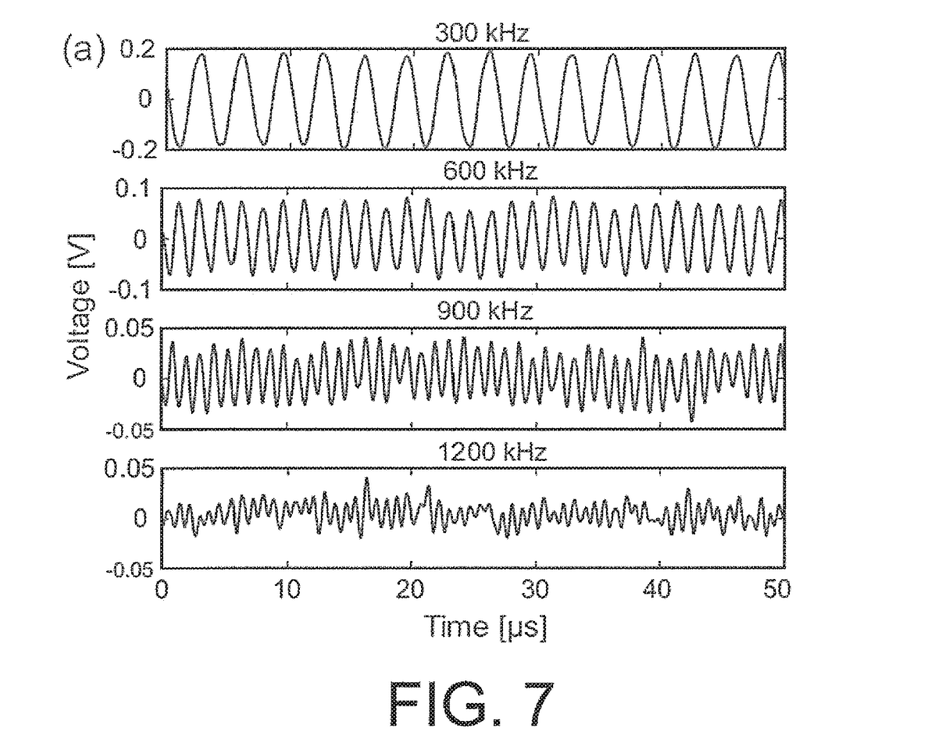
FIG. 7 shows retrieved sinusoidal RF signals for various modulation frequencies for a 19.3 GHz carrier with microwave power of −1 dBm.
Figure 8:
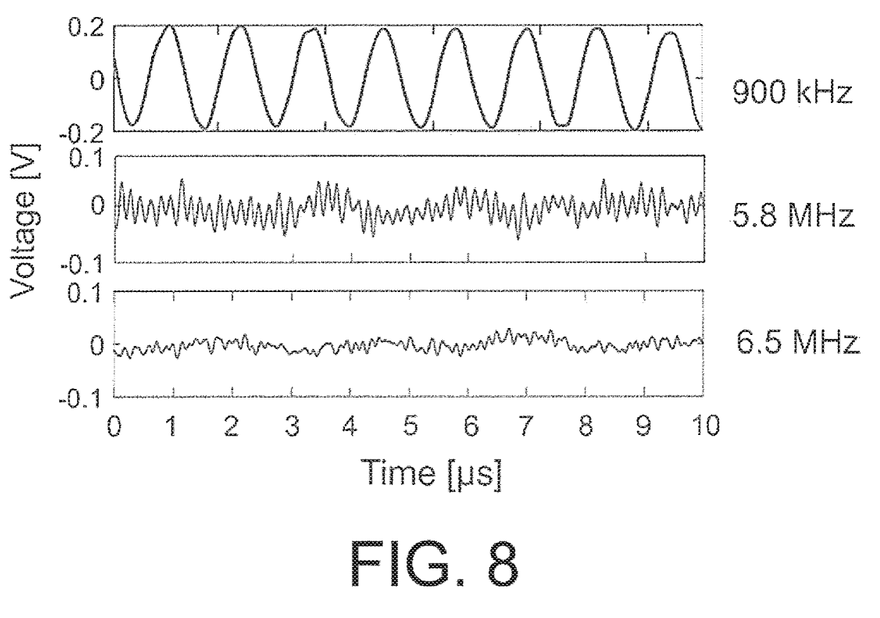
FIG. 8 shows retrieved sinusoidal RF signals from a 5 GHz RF field amplitude modulation at different frequencies.

FIG. 7 depicts single-shot traces of outputs of the decoder 50 and/or RoF system 10, namely, photovoltages corresponding to the transmitted probing light beam for a range of modulation frequencies for a carrier microwave field at 19.3 GHz amplitude-modulated by sinusoidal signal RF fields. These traces were obtained from a test sinusoidal RF signal, corresponding to an RF signal generated by the source 20 of the RoF system 10, generated by an arbitrary waveform generator (e.g., Agilent 33120A) and used to provide direct amplitude modulation to the microwave carrier. The applied RF field has been adjusted such that its full amplitude corresponds to a modulation depth of 100% for the microwave field. Similarly, FIG. 8 shows retrieved optical signals from a 5 GHz RF field amplitude modulated at different frequencies (900 kHz, 5.8 MHz, and 6.5 MHz). As it is apparent from these figures, the RoF system 10 and/or optical antenna 30 is therefore able to maintain high signal fidelity with modulation frequencies in the order of MHz.

Figure 9:
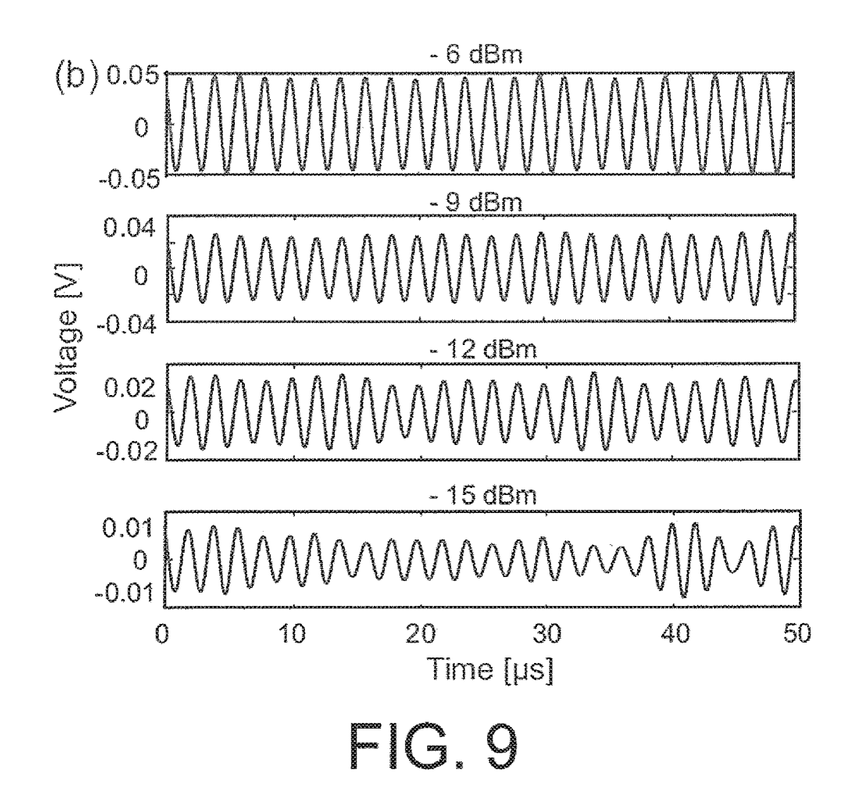
FIG. 9 show different RF signals for a modulation frequency of 500 kHz for various power levels of the 19.3 GHz carrier.
Figure 10:
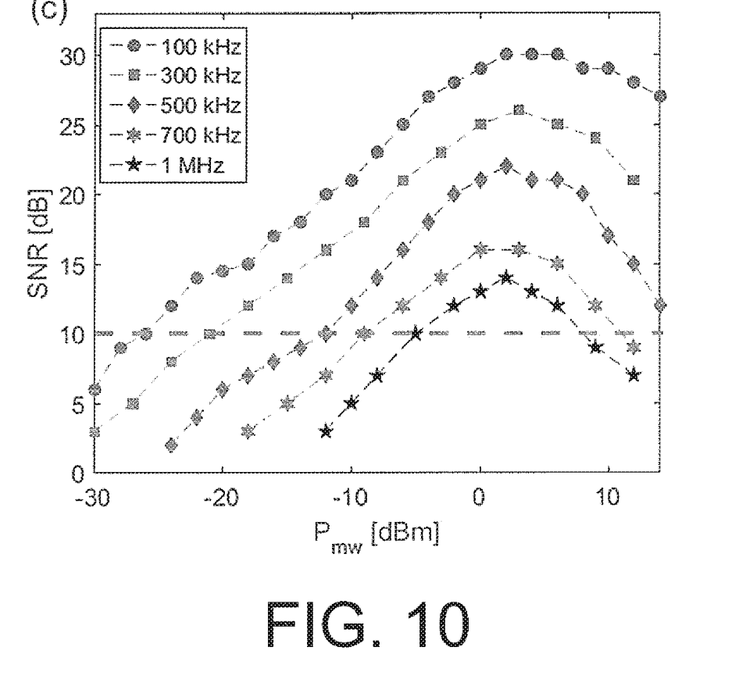
FIG. 10 is a graph illustrating different signal-to-noise ratios as functions of the carrier powers for a range of modulation frequencies; and, FIG. 11 is a graph illustrating different signal-to-noise ratios as functions of modulation frequencies for a range of microwave carrier frequencies.

Another notable consideration is the signal-to-noise ratio (SNR) in the photovoltages produced by the transmitted light beam. FIG. 9 shows outputs of the decoder 50 and/or RoF system 10, i.e., photovoltages for a modulation frequency of 500 kHz for various microwave power levels of a 19.3 GHz carrier while FIG. 10 shows different SNRs measured on a spectrum analyser with a resolution bandwidth of 10 kHz. Here, the SNR is defined as the ratio of the power spectral density at the modulation frequency to the average power spectral density of the electronic noise floor over a 2 MHz band. The gain flatness of the photodetector 51 is greater than 1.5 dB over this band. FIG. 10 shows the SNRs as functions of the carrier powers (Pmw) for a range of modulation frequencies. As is apparent from FIG. 10, the SNRs grow approximately linearly with the carrier power up to about 3 dBm beyond which they drop. Taking a SNR equal to 10 as a threshold for high-fidelity signal transfer (e.g., cutoff point), the RoF system 10 and/or optical antenna 30 can achieve data transfer with high-fidelity for a signal bandwidth of 1 MHz over a range of Pmw.

In the RoF system 10, the noise is dominated by electronic noise of the decoding stage (transimpedance stage of the photodetector 51) and the light sources (e.g., lasers) frequency noise. Rydberg states are sensitive to low-frequency (less than 1 kHz) electric fields which cause a DC Stark shift of these states. However, the RoF system 10 and/or optical antenna 30 is not affected by these slow-varying fields since a feedback loop is used for frequency-locking the coupling light source to automatically track such variations. Background electric field amplitude at a frequency close to the signal bandwidth is typically extremely small (less than 10 nV/cm) and can be further reduced by shielding low-frequency electric fields.

Figure 11:
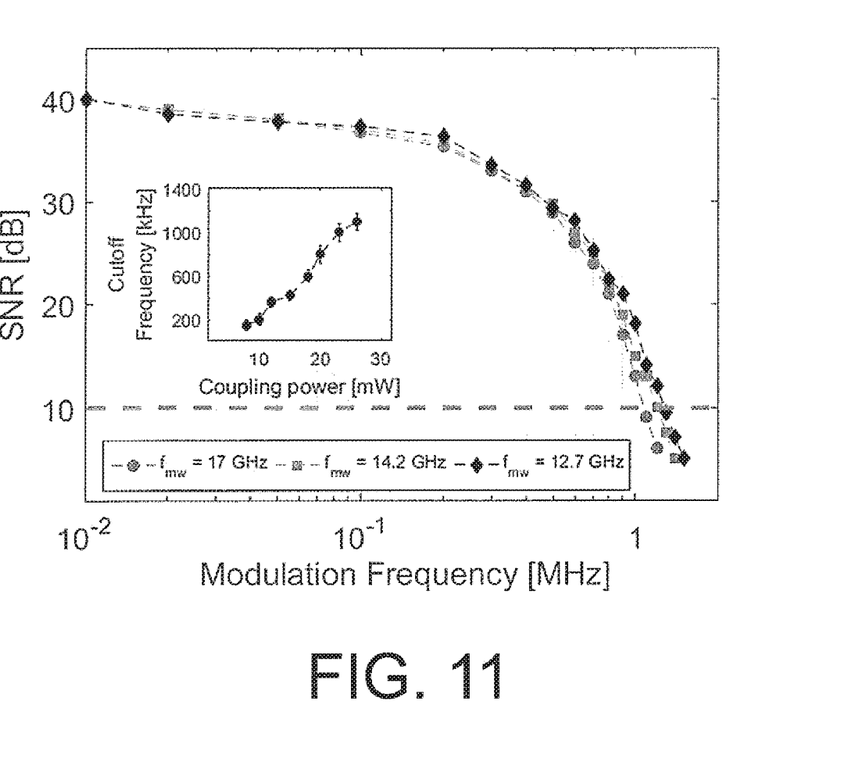

FIG. 11 shows the SNR as a function of the modulation frequency for three different microwave carrier frequencies, corresponding to different pairs of Rydberg states coupled by the microwave field. The coupling light beam power is kept constant at 25 mW, as is the carrier microwave power (−1 dBm). FIG. 11 shows that the maximum signal bandwidth of the RoF system 10 and/or optical antenna 30 is about 1.1 MHz. The cutoff modulation frequency (horizontal threshold in dotted line) appears to be weakly dependent on the carrier microwave frequency being used. The inset of FIG. 11 shows the cutoff frequency for high-fidelity signal transfer as a function of the coupling light beam power for a 14.2 GHz carrier field with a power of −1 dBm. As is apparent from the inset of FIG. 11, the maximum available signal bandwidth increases nearly linearly with the coupling light beam power, suggesting that the limiting parameter is the available light source power.

In the different embodiments described hereinabove, the RoF system 10 and/or optical antenna 30 allow for a direct encoding/transfer of data embedded in RF signals to the optical domain. A signal bandwidth exceeding 1 MHz can be achieved but is limited by technical noise. However, the RoF system 10 and/or optical antenna 30 can achieve higher bandwidths through a combination of shot-noise limited photodetection and higher coupling light source power. In addition, SNR and bandwidth can be further enhanced by interferometric techniques e.g., frequency-modulation spectroscopy and measuring optical response in the dispersive domain.

Sensitivity and conversion gain are other considerations of interest for the RoF system 10 and/or the optical antenna 30. Sensitivity can be defined as the minimum RF power detected by the antenna 30 over a certain period of time. Conversion gain may be defined as the number of optical photons that respond to a single RF photon. Table 1 below illustrates the sensitivity of the RoF system 10 and/or optical antenna 30 to RF power and the estimated conversion gains for a number of carrier RF frequencies.

TABLE 1

Sensitivity and conversion gain of the RoF system 10 and/or the optical antenna 30

| RF frequency (GHz) | Sensitivity (pW/Hz) | Conversion Gain |
|---|---|---|
| 5 | $4 \cdot 10^{-6}$ | 0.75 |
| 12.7 | $3 \cdot 10^{-6}$ | 0.5 |
| 19.2 | $3 \cdot 10^{-6}$ | — |

As is evident from Table 1, the RoF system 10 and/or optical antenna 30 has an extremely high sensitivity to the different RF fields. Ultimately, optical detection is limited by photon shot noise. However, the RoF system 10 and/or the optical antenna 30 may comprise different and/or higher optical power to increase sensitivity to RF fields. In one embodiment, multiple coupling and/or probing light beams may be used in parallel to increase the optical power of the RoF system 10 and/or optical antenna 30.

As explained hereinabove, the light beams are directed to pass through the gas or vapor cell 33. In one example, light beams having a 22-micron focus size—giving them cross-sectional areas of 0.001 mm²—may be used in parallel to pass through the gas or vapor cell 33. In this example, this means that about 1000 of such light beams could be contained within an area of 1 mm² thereby allowing use of a gas or vapor cell 33 of a millimetre scale. As the effective size of the antenna 30 is given by the dimensions of the focus of the light beams, this allows for massively parallel data-transmission with a small form-factor optical antenna 30.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

What is claimed is:

1. A system for a radio-over-fiber (RoF) information linkage, the system comprising:
    a vapor cell enclosing a gas of atoms, the vapor cell configured to be coupled to an information signal source via an RF field, the information signal source configured to generate an information signal of a data transfer protocol, wherein the RF field is a carrier frequency modulated by the information signal;
    a probing light source configured to propagate a probing light beam through the vapor cell, a frequency of the probing light beam being fixed within a range in which the atoms transition from a first quantum state to a second quantum state; and,
    a coupling light source configured to propagate a coupling light beam through the vapor cell, a frequency of the coupling light beam being either resonant or off-resonant with transition of the atoms from the second quantum state to a Rydberg state;
    wherein the vapor cell is configured such that on exposure thereof to the RF field that is the carrier frequency modulated by the information signal, the system is configured to encode the information signal into the probing light beam,
    wherein the probing light source is configured to couple the probing light beam to an optical fiber after the probing light beam passes through the vapor cell, wherein the optical fiber is configured to carry the probing light beam to a remote optical detector.

2. The system of claim 1, wherein the system is configured to encode the information signal into the probing light beam by modulating an amplitude and/or a phase of the probing light beam.

3. The system of claim 1, wherein the gas of atoms comprises one or more of: atoms from alkali metals; atoms from alkaline metals; rubidium atoms; and, potassium atoms.

4. The system of claim 1, wherein the vapor cell is configured such that on exposure thereof to a different RF field carrying information from a different RF signal, the apparatus is configured to encode the different RF signal into the probing light beam using a different Rydberg state without reconfiguring the apparatus.

5. The system of claim 1, wherein the probing and coupling light sources each comprise a laser configured to generate the probing and coupling light beams respectively, and wherein the probing and/or coupling light beam(s) is/are derived from external cavity diode lasers.

6. The system of claim 5, wherein a wavelength of the probing light beam is about 780 nm and/or a wavelength of the coupling light beam is about 480 nm.

7. The system of claim 1, further comprising thermal control elements configured to stabilize the gas or vapor cell at a desired temperature.

8. The system of claim 1, wherein the gas or vapor cell comprises a housing having a first end and a second end, and the probing light beam passes through the housing from the first end to the second end along a first axis.

9. The system of claim 8, wherein the coupling light beam is counterpropagating to the probing light means.

10. The system of claim 8, further comprising a retro-reflector configured to re-propagate the probing light beam through the gas or vapor cell such that the probing light beam passes through the gas or vapor cell from the second end to the first end along a second axis.

11. The system of claim 10, wherein the second axis is the same or substantially the same as the first axis; or is parallel and/or axially separated from the first axis.

12. The system of claim 10, wherein the retro-reflector comprises a corner cube or a confocal or afocal retro-reflector.

13. The system of claim 12, wherein the confocal or afocal retroreflector comprises one or more index mismatched surfaces, the one or more index mismatched surfaces comprising non-flat surfaces being aspherical, near-spherical or spherical concave surfaces.

14. A communications system for an RF-to-optical information linkage, the communications system comprising:
    a signal source configured to generate an information signal of a data transfer protocol;
    an RF source to generate and transmit an RF field, wherein the information signal of the data transfer protocol is encoded in the RF field in the form of a modulation;
    an optical antenna comprising:
    a vapor cell enclosing a gas of atoms;
    a probing light source configured to propagate a probing light beam through the vapor cell, a frequency of the probing light beam being fixed within a range in which the atoms transition from a first quantum state to a second quantum state; and,
    a coupling light source configured to propagate a coupling light beam through the vapor cell, a frequency of the coupling light beam being either resonant or off-resonant with transition of the atoms from the second quantum state to a Rydberg state;
    wherein the vapor cell is configured such that on exposure thereof to the RF field, the apparatus is configured to encode the information signal from the RF field into the probing light beam;
    wherein the probing light beam encoded with the information signal is configured to be coupled through free space to an optical detector at a remote location.

15. The communications system of claim 14, wherein the apparatus is configured to encode the information signal into the probing light beam by modulating an amplitude and/or a phase of the probing light beam.

16. The communications system of claim 14, wherein the vapor cell is configured such that on exposure thereof to a different RF field carrying information from a different RF signal, the apparatus is configured to encode the different RF signal into the probing light beam using a different Rydberg state without reconfiguring the apparatus.

* * * * *